United States Patent
Brill et al.

(10) Patent No.: US 7,191,648 B2
(45) Date of Patent: Mar. 20, 2007

(54) LEVEL GAUGE FOR OIL-FILLED TRANSFORMER, CHOKE, OR TAP CHANGER

(75) Inventors: Reiner Brill, Nidda (DE); Kai Hämel, Jossgrund (DE); Karsten Viereck, Regenstauf (DE)

(73) Assignee: Maschinenfabrik Reinhausen GmbH, Regensburg (DE)

( * ) Notice: Subject to any disclaimer, the term of this patent is extended or adjusted under 35 U.S.C. 154(b) by 0 days.

(21) Appl. No.: 11/250,773

(22) Filed: Oct. 14, 2005

(65) Prior Publication Data

US 2006/0081046 A1   Apr. 20, 2006

(30) Foreign Application Priority Data

Oct. 14, 2004 (DE) ............. 10 2004 050 009

(51) Int. Cl.
*G01F 23/00* (2006.01)
(52) U.S. Cl. .............. 73/313; 73/314; 73/317
(58) Field of Classification Search ........... 73/313, 73/314, 317
See application file for complete search history.

(56) References Cited

U.S. PATENT DOCUMENTS

| | | | | |
|---|---|---|---|---|
| 3,112,464 | A | * | 11/1963 | Ratajski et al. ........ 338/32 H |
| 4,911,011 | A | * | 3/1990 | Fekete et al. ............ 73/313 |
| 5,159,268 | A | * | 10/1992 | Wu .................... 324/207.2 |
| 5,982,170 | A | * | 11/1999 | McCurley et al. ...... 324/207.2 |
| 6,679,116 | B2 | * | 1/2004 | Ross, Jr. .................. 73/317 |
| 6,708,562 | B2 | * | 3/2004 | Kruger et al. ............ 73/314 |
| 6,734,667 | B2 | * | 5/2004 | Lorenzen ............. 324/207.2 |
| 2003/0084720 | A1 | * | 5/2003 | Ross, Jr. .................. 73/317 |
| 2003/0094044 | A1 | | 5/2003 | Kruger et al. |
| 2003/0177827 | A1 | * | 9/2003 | Lorenzen ................. 73/313 |
| 2004/0154393 | A1 | * | 8/2004 | Taylor et al. ............ 73/313 |

FOREIGN PATENT DOCUMENTS

| DE | 41 19 063 | 12/1992 |
|---|---|---|
| FR | 2 845 469 | 4/2004 |

OTHER PUBLICATIONS

XP-002374015; Nov. 1961; Machine Design, 33; pp. 156; "Transducers"; Bd. 33; Nr. 24.

* cited by examiner

*Primary Examiner*—Daniel S. Larkin
*Assistant Examiner*—Samir M. Shah
(74) *Attorney, Agent, or Firm*—Andrew Wilford

(57) ABSTRACT

An electric power apparatus has a oil-filled vessel in which a float is connected to a float shaft that rotates as the float rises and falls with the level of oil. A level indicator has a display shaft extending along and pivotal about an axis, and coupled to the float shaft. An indicia display adjacent the shaft is swept by a pointer fixed on the shaft and juxtaposed with the indicia display go that the level of the oil in the vessel is indicated by the pointer. A disk fixed to the shaft has an outer periphery with a region of a shape having a radius varying angularly from one end of the region to an opposite end of the region. A noncontact proximity sensor is radially spacedly juxtaposed with the region of the disk for producing an output corresponding to the radial distance between the region and the sensor.

3 Claims, 3 Drawing Sheets

LEVEL GAUGE FOR OIL-FILLED TRANSFORMER, CHOKE, OR TAP CHANGER

FIELD OF THE INVENTION

The present invention related to a liquid-level indicator or fill gauge. More particularly this invention concerns a level gauge usable with an electric power apparatus having an oil-filled vessel, for example a transformer, choke, or tap changer.

BACKGROUND OF THE INVENTION

As described in U.S. Pat. No. 6,708,562, an oil-level indicator is mounted on the oil expansion vessel of an electric power transformer, choke or tap changer in which a float is operatively connected to a float rod that converting the vertical movement of the float to the rotation of the float shaft in turn connected with a display shaft carrying an indicator or pointer which rides on or over a scale, This displays shaft in also via a transmission, e.g. a belt, to an input shaft carrying an angle encoder of an electromagnetic type having a magnetic hub which cooperates with a contactless pick-up in the form of a Hall element with integrated ASIC to form an ASIC Hall sensor, converting the position of the magnetic actuator into an absolute incremental or sine-cosine output signal.

Such a gauge or indicator is highly effective but, as a result of its angle encoder, is relatively expensive. The separate mounting of the angle encoder on the angle-encoder shaft with the necessary coupling to the display shaft carrying the pointer increases the complexity, expense, and likelihood of failure of the device.

OBJECTS OF THE INVENTION

It is therefore an object of the present invention to provide an improved level gauge for oil-filled transformer, choke, or tap changer.

Another object is the provision of such an improved level gauge for oil-filled transformer, choke, or tap changer that overcomes the above-given disadvantages, in particular that is of simple construction and that produces an accurate electrical output representing the fill level.

SUMMARY OF THE INVENTION

The instant invention is used in combination with an electric power apparatus having an oil-filled vessel in which a float is connected to a float shaft that rotates an the float rises and falls with the level of oil in the vessel. It has a display shaft journaled in a base, extending along and pivotal about an axis, and coupled to the float shaft for generally joint and synchronous pivoting therewith. An indicia display fixed relative to the base adjacent the shaft is swept by a pointer fixed on the shaft and juxtaposed with the indicia display so that the level of the oil in the vessel in indicated by a position of the pointer on the display. In accordance with the invention a disk fixed to the shaft has an outer periphery with a region of a shape having a radius varying angularly from one end of the region to an opposite end of the region. A noncontact proximity sensor fixed relative to the base in radially spacedly juxtaposed with the region of the disk; for producing an analog output corresponding to the radial distance between the region and the sensor. As the disk rotates, the radial distance between its periphery and the proximity sensor varies and this measurement is easily converted into an output, typically analog, that in directly related to float position.

The sensor according to the invention can be, for example, of the capacitative or magnetic type, as for example the CapaNCDT series of Micro-Epsilon or the V4A metal sensors of Baumer Electric. Such sensors work wholly without contact but produce an output that accurately reflects the actual spacing between the sensor and the object it is aimed at. Thus a light-weight disk on the dial shaft of a standard mechanical gauge cooperates with such a sensor to produce an electrical output that is easily remotely monitored.

The sensed region of the disk according to the invention is made of metal that is easily detected capacitatively or electromagnetically.

In addition according to the invention the region is of cycloidal or eccentric shape. The sensor is directed radially of the axis at the region. In addition the pointer in movable through less than 180° between positions corresponding to maximum and minimum oil levels in the vessel, and the region extends over less than 180°.

BRIEF DESCRIPTION OF THE DRAWING

The above and other objects, features, and advantages will become more readily apparent from the following description, reference being made to the accompanying drawing in which.

SPECIFIC DESCRIPTION

Figure 1:
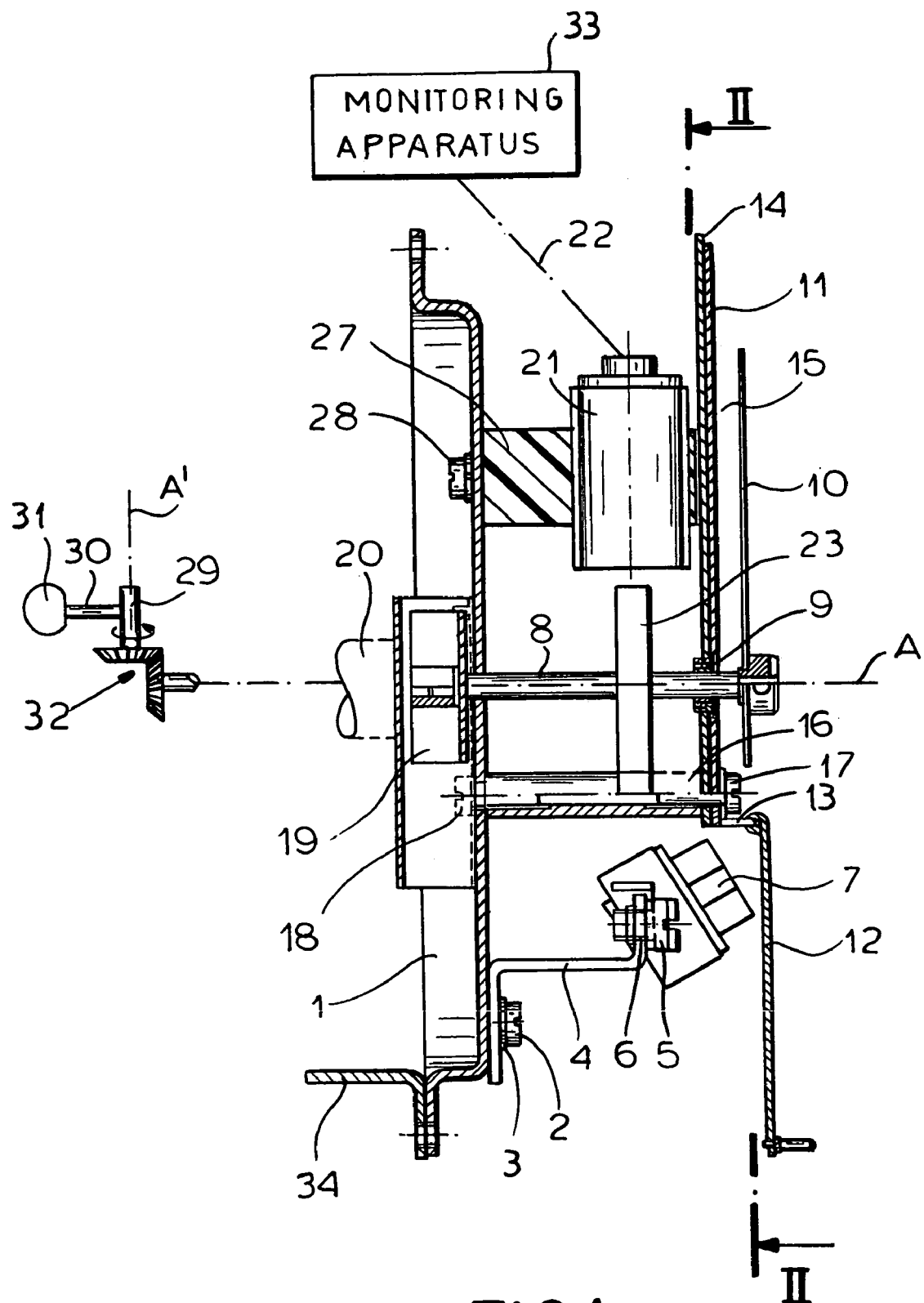
FIG. 1 in a partly diagrammatic side view of the gauge or indicator according to the invention.
Figure 2:
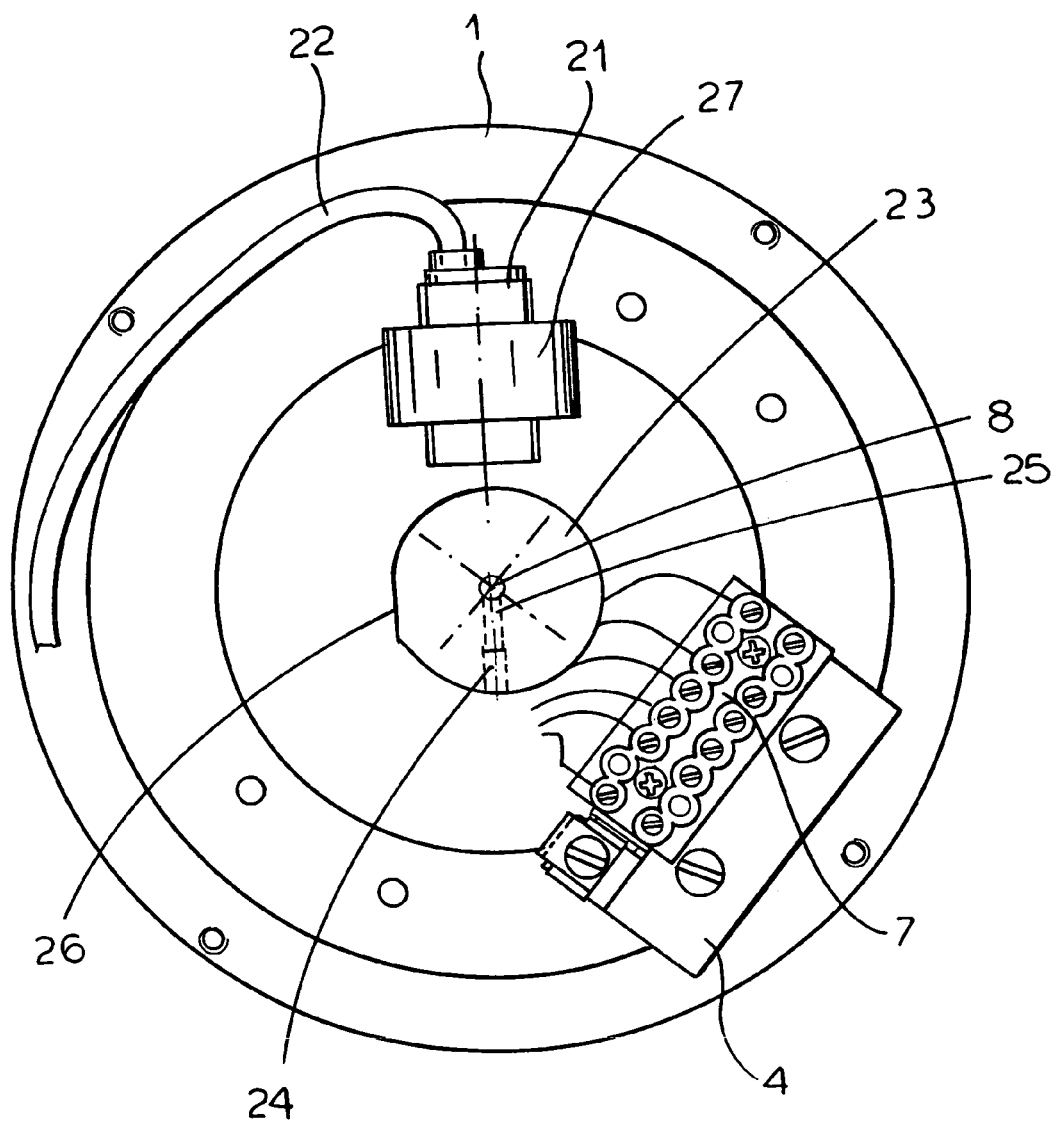
FIG. 2 is a sectional view taken from above along line II—II of FIG. 1.

As seen in FIGS. 1 and 2, a base plate 1 sitting atop a vessel 34 of an oil-filled transformer, choke, or tap changer has a shaft 20 centered on and rotatable about an axis A and connected via bevel gearing 32 to a shaft 29 rotatable about a perpendicular axis A' and from which projects an arm 30 carrying a float 31. Thus as the liquid level inside the transformer, choke, or tap changer rises and falls, the float 31 will orbit about the axis A' and this movement will be converted into an angular movement of the shaft 20 about the axis A through an angular travel $\alpha$ (FIG. 3) of less than 180°.

The base plate 1 has a bracket 4 secured in place by a screw 2 and washer 3 and carrying a cable guide 6 and terminal strip 7 held in place by a screw 5. A central shaft 8 passing perpendicularly through the plate 1 and seated in a bearing 9 carries a radially extending pointer 10 angularly shiftable along an indicia-carrying generally semicircular dial plate 11 as shown in FIG. 3 of the above-cited US patent. Another generally semicircular access plate 12 is secured at a chordal hinge 13 to the lower edge of the dial plate 11 and can be swung out for access to the terminal strip 7. The dial plate 11 in secured by at least one screw 15 to a front mounting plate 14 extending parallel to the plate 1 and fixed thereon by threaded sleeves 16 extending parallel to the axis and with screws 17 and 18 secured through the plates 14 and 1 in opposite ends of the sleeves 16. This structure corresponds generally to that of above cited U.S. Pat. No. 6,708,562.

Figure 3A:
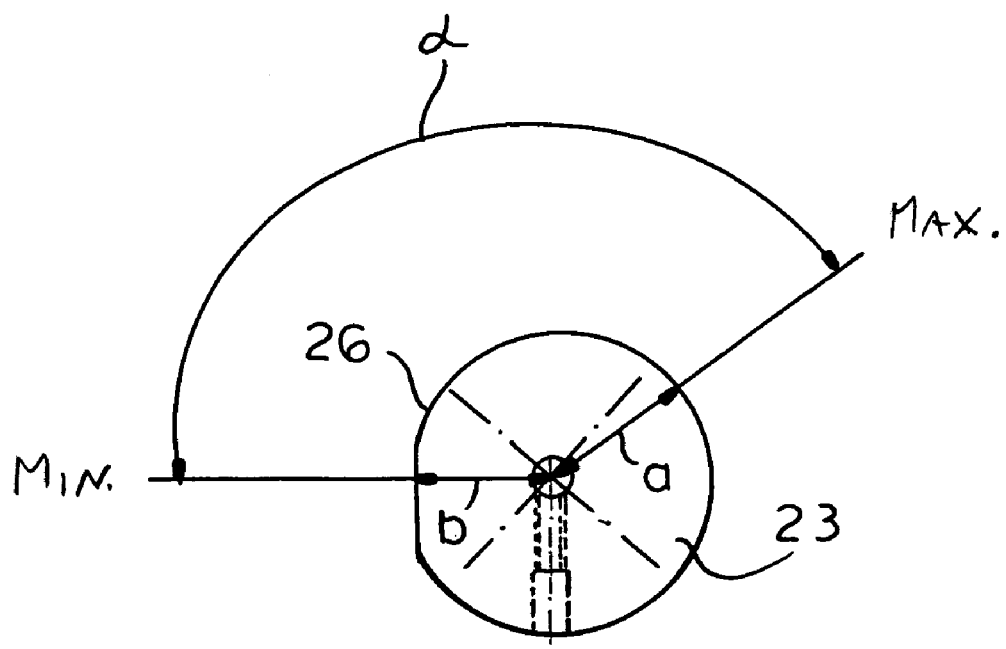
FIG. 3a is a detail view of the sensor disk in accordance with the invention.
Figure 3B:
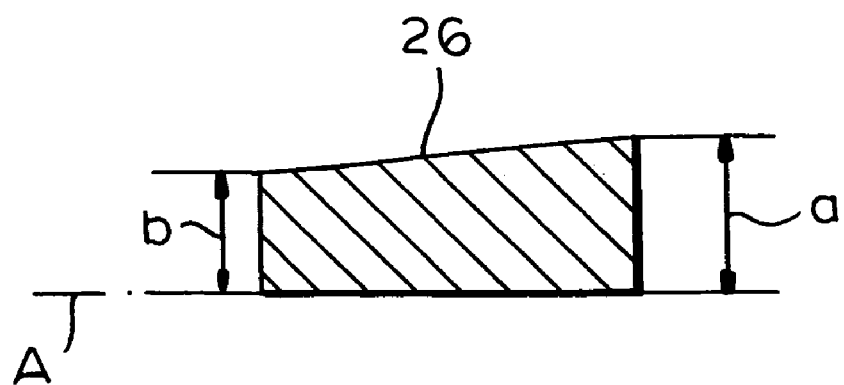
FIG. 3b in a developed view illustrating the surface shape of the sensor disk.

A magnetic coupling 19 rotationally couples the shaft 8 to the shaft 20 for joint and synchronous rotation about the axis A. A noncontact capacitative or magnetic proximity sensor 21 with an output cable 22 in spaced radially from a disk 23 fixed by a screw 25 seated in a threaded bore 24 on the shaft 8, although a keyed or splined connection would also be usable. This disk 23 as shown in FIGS. 3a and 3b has a radially outwardly directed periphery 26 that varies over a region of the angle α from a relatively great radial spacing a to a relatively small radial spacing b. The variation between the ends at the spacings a and b can be uniform or vary logarithmically or exponentially. The sensor 21 is secured in a mount 27 held by a screw 28 to the base plate 1.

With this system any angular position of the shaft 8, which can be read easily on the dial plate 11, also corresponds to a respective radial spacing between the sensor 21 and the periphery 26, which is easily translated by the sensor 21 into an analog or digital output that is transmitted, e.g. by RS485 digital data standard, to a remote monitoring apparatus 33. When the sensor 21 is of the capacitative type the edge region 26 of the disk 23 need merely have a reflective grounded edge strip and when the sensor 21 is of the magnetic type, at least the edge region 26 of the disk 23 is made of steel or aluminum. The tiny mass added to the shaft 8 by the disk 23 is irrelevant to the operation of the standard mechanical gauge, ad the disk 23 and sensor 21 constitute an inexpensive and very reliable upgrade allowing remote monitoring.

We claim:

1. In combination with an electric power apparatus having an oil-filled vessel in which a float is connected to a float shaft that rotates as the float rises and falls with the level of oil in the vessel, a liquid-level indicator comprising:
   a base;
   a display shaft journaled in the base and extending along and pivotal about an axis;
   means coupling the display shaft to the float shaft for generally joint and synchronous pivoting;
   an indicia display fixed relative to the base adjacent the display shaft;
   a pointer fixed on the display shaft, movable through less than 180° between positions corresponding to maximum and minimum oil levels in the vessel, and juxtaposed with the indicia display, whereby the level of the oil in the vessel is indicated by a position of the pointer on the display;
   a disk fixed to the display shaft and having an outer periphery with a region of a shape having a radius varying angularly from one end of the region to an opposite end of the region, the region extending over less than 180°; and
   means including a noncontact proximity sensor fixed relative to the base and radially spacedly juxtaposed with the region of the disk for producing an output corresponding to the radial distance between the region and the sensor.

2. The liquid-level indicator defined in claim 1 wherein the region is made of metal.

3. The liquid-level indicator defined in claim 1 wherein the region is of cycloidal shape.

* * * * *